(12) United States Patent
Rubira Branco

(10) Patent No.: US 11,934,667 B1
(45) Date of Patent: Mar. 19, 2024

(54) ENCRYPTED-DATA-ONLY MEDIA OPERATIONS

(71) Applicant: Amazon Technologies, Inc., Seattle, WA (US)

(72) Inventor: Rodrigo Rubira Branco, Sulphur Bluff, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/364,126

(22) Filed: Jun. 30, 2021

(51) Int. Cl.
*G06F 3/06* (2006.01)

(52) U.S. Cl.
CPC .......... *G06F 3/0623* (2013.01); *G06F 3/0619* (2013.01); *G06F 3/064* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 7,283,631 B2* | 10/2007 | Torii | ..................... | G06F 21/608 713/160 |
| 8,341,724 B1* | 12/2012 | Burns | ..................... | H04L 69/22 709/224 |
| 9,501,640 B2* | 11/2016 | Beveridge | ............... | G06F 21/56 |
| 10,121,003 B1* | 11/2018 | Adams | ................... | G06F 21/565 |
| 11,082,441 B1* | 8/2021 | Bouguerra | ............. | G06N 3/045 |
| 2006/0294386 A1* | 12/2006 | Yuval | .................... | H04L 9/0631 380/37 |
| 2008/0126813 A1* | 5/2008 | Kawakami | .............. | G06F 21/85 713/193 |
| 2008/0184367 A1* | 7/2008 | McMillan | ............. | G06F 21/563 726/23 |
| 2015/0117644 A1* | 4/2015 | Best | ...................... | H04W 12/08 380/46 |
| 2017/0004306 A1* | 1/2017 | Zhang | .................... | G06F 21/562 |
| 2018/0024920 A1* | 1/2018 | Thomas | .............. | G06F 12/0246 711/103 |
| 2021/0103490 A1* | 4/2021 | LeCrone | ............. | G06F 11/0727 |

* cited by examiner

*Primary Examiner* — Yaima Rigol (74) *Attorney, Agent, or Firm* — NICHOLSON DE VOS WEBSTER & ELLIOTT LLP (57) ABSTRACT

Techniques for encrypted-data-only media operations are described. In some instances, data from a source to be written to memory of a storage device is received by a storage device and the storage devices determines whether the data is encrypted at a storage location based on an amount of entropy of the received data. When the received data is not encrypted a media error is returned to the source and when the received data is encrypted the data is written.

28 Claims, 8 Drawing Sheets

ENCRYPTED-DATA-ONLY MEDIA OPERATIONS

BACKGROUND

Encrypting data at rest is a commodity. It is currently supported by many different media manufacturers directly in the hardware (in which the HDD/SSDs is responsible for transparently encrypting/decrypting the data that is stored/read) and by all major operating systems (in which the operating system abstracts the encryption/decryption operation).

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for using encrypted-data-only storage. Having the data encrypted at rest solves major security problems, such as stolen or lost equipment containing sensitive data (in which the data might costs many times more than the actual equipment). Having the encryption in the operating system (versus performed by the device itself) incredibly has some benefits, such as removing the firmware from such devices from the trust boundary of a platform (i.e., if during the supply chain delivery of an equipment, or in anytime during its operation the firmware of the device gets modified, the malicious firmware won't be able to see/modify the data given it is encrypted before touching the device). It also makes it easier to swap between different vendors (without having to perform security tests of the different vendor's implementations) and to create recovery strategies (so a lost key does not become a catastrophic event) —some of those are possible with a device-supported encryption, but harder to do in corporations with multiple device providers (given their proprietary implementations).

The problem with using operating system encryption though is how to trust that the data in the media itself is encrypted? What happens if such media is installed in a platform that does not perform the OS-level encryption and no one notices? While for an individual machine this is an easy problem, and in a corporate environment one could probably have software checks running on systems, how would that happen in a large datacenter?

Embodiments detailed herein address the problem without having to create highly complex flows in the media hardware/firmware (for example, a solution would be to use an unlock mechanism from the media, and only have the unlock password—or key—available to the platforms that have encryption).

Note that since this approach is probabilistic in some embodiments a few writes could have enough entropy that they end up going unencrypted to memory. However, that system would not work as an OS would not be fully installable in such a system. The system would not fully boot to even start having secrets (that would be problematic to leakage even if only in pieces). So, while the defense is per-read/write probabilistic, the end result is fully deterministic.

Figure 1:
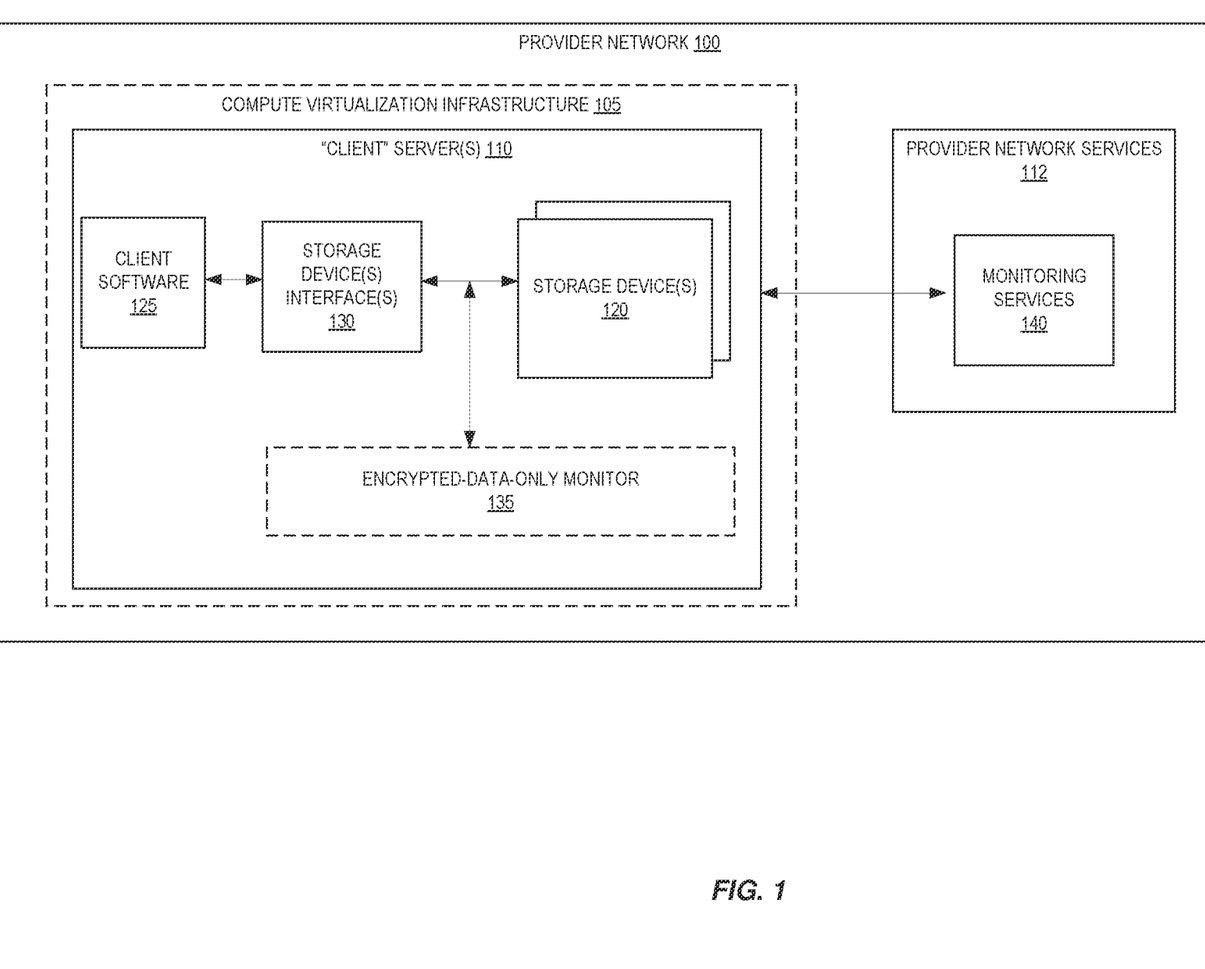
FIG. 1 illustrates a provider network that is capable of utilizing encrypted-data-only in storage solutions.

FIG. 1 illustrates a provider network that is capable of utilizing encrypted-data-only in storage solutions. Note that the discussion regarding encrypted-data-only is not limited to a provider network setting. For example, the concepts described herein may be practiced on an individual device.

As shown, one or more "client" servers 110 (servers utilized, at least partially, to execute client code) utilize one or more storage devices 120 that support an c configuration. As detailed above, in that configuration, the one or more storage devices 120 do not write data that appears to be unencrypted. Note that some storage devices in the client server(s) may not utilize encrypted-data-only. In some embodiments, one or more of the client servers 110 are "bare metal" that support one tenant only (e.g., does not require virtualization although virtualization may be used). In some embodiments, one or more of the client servers 110 utilization virtualization for sharing resources across multiple tenants. Exemplary storage devices include solid state drives, optical disks, hard drive disks, FLASH memory, 3D cross point memory, etc.

Encrypted-data-only using storage devices have a mode for encrypted-data-only. In that mode, the storage device only writes encrypted data and returns media errors when a write operation for non-encrypted content is attempted. A media error for a write indicates a bad write and a media error for a read indicates a bad read. The storage device verifies the use of encryption using an entropy check (looking for high-entropy which is characteristic for at least symmetric cipher encryption algorithms) As such, the storage device does not need to have a key (or even an encryption/decryption algorithm) and itself does not need to be placed in a root of trust.

Each of the one or more storage devices 120 is physically coupled to a storage device interface 130 that is between a processor (or processors) and the storage device. The storage device interface 130 may be a part of, or attached to, input/output (I/O) controller hub, Fusion Controller Hub, peripheral bridge, Advanced Microcontroller Bus Architecture, Advanced eXtensible Interface, etc. Exemplary interfaces include, but are not limited to: serial advanced technology attachment (SATA), universal serial bus (USB) (e.g., USB, USB 2.x, USB 3.x, USB 4.x, etc.), external-SATA (eSATA), parallel ATA, Thunderbolt, PCIe, etc.

Logically coupled to the storage interface(s) 130, storage device(s) 120, and/or interconnect between them, is an encrypted-data-only monitor 135 which monitors response from the one or more storage devices 120. In particular, the encrypted-data-only monitor 135 at least looks for media write error indications. The encrypted-data-only monitor 135 is, in some embodiments, a software component. When the encrypted-data-only monitor 135 is software it may be a standalone software, a part of an operating system, a part of a virtual machine monitor (VMM)/hypervisor, etc. The encrypted-data-only monitor 135 is, in some embodiments, a hardware component dedicated to monitoring the output of the storage device(s) 120. In some embodiments, the encrypted-data-only monitor 135 is firmware. In some embodiments, the encrypted-data-only monitor 135 performs the entropy check.

In some embodiments, the encrypted-data-only monitor 135 also communicates when media write errors to an external entity. For example, the encrypted-data-only monitor 135 may provide such information to one or more monitoring services 140 that are a part of provider network services 112. In some embodiments, the encrypted-data-only monitor 135 is, provides this information to a VMM or OS. The receiving entity can then perform a variety of actions including, but not limited to: indicating that the storage device may be failing (and is to be checked and/or removed from service), indicating that the software that thinks it is writing encrypted data, but is not, etc. The monitoring service(s) 140 are responsible for alerting when there is a component health issue, encryption usage issue, etc.

In some embodiments, client software 125 is programmed to write encrypted data to the storage device(s) 120. As such, the client software 125 includes an encryption algorithm, utilizes one provided by an operating system, VMM, etc., and/or uses encryption capabilities provided by the processing system of the server (e.g., using AES instructions, using an encryption block, etc.). Examples of encryption algorithms include, but are not limited to: AES (such as AES-128, AES-256, AES-XTS, etc.), SM3, SM4, Blowfish, TripleDES, Twofish, IDEA, MD5, HMAC, etc.

In some embodiments, the storage device(s) 120 that support encrypted-data-only include a physical means (such as a switch) to activate/deactivate encrypted-data-only usage. In some embodiments, the storage device(s) 120 that support encrypted-data-only are programmable to turn on encrypted-data-only usage. In some embodiments, a password-based mechanism is used to activate/deactivate encrypted-data-only usage such that the storage device(s) 120 that support encrypted-data-only would only permit unencrypted data to be written if such a password is entered (as in the default is on). In some embodiments, the storage device(s) 120 that support encrypted-data-only only support that mode.

The provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM can be provided one or more IP addresses in the overlay network, and the VMM on a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations, such as transferring customer data to and from the customer resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

For example, in various embodiments, a "serverless" function can include code provided by a user or other entity—such as the provider network itself—that can be executed on demand Serverless functions can be maintained within a provider network by an on-demand code execution service, and can be associated with a particular user or account, or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources can be maintained in a "ready" state (e.g., having a pre-initialized runtime environment configured to execute the serverless functions), allowing the serverless functions to be executed in near real-time.

Figure 2:
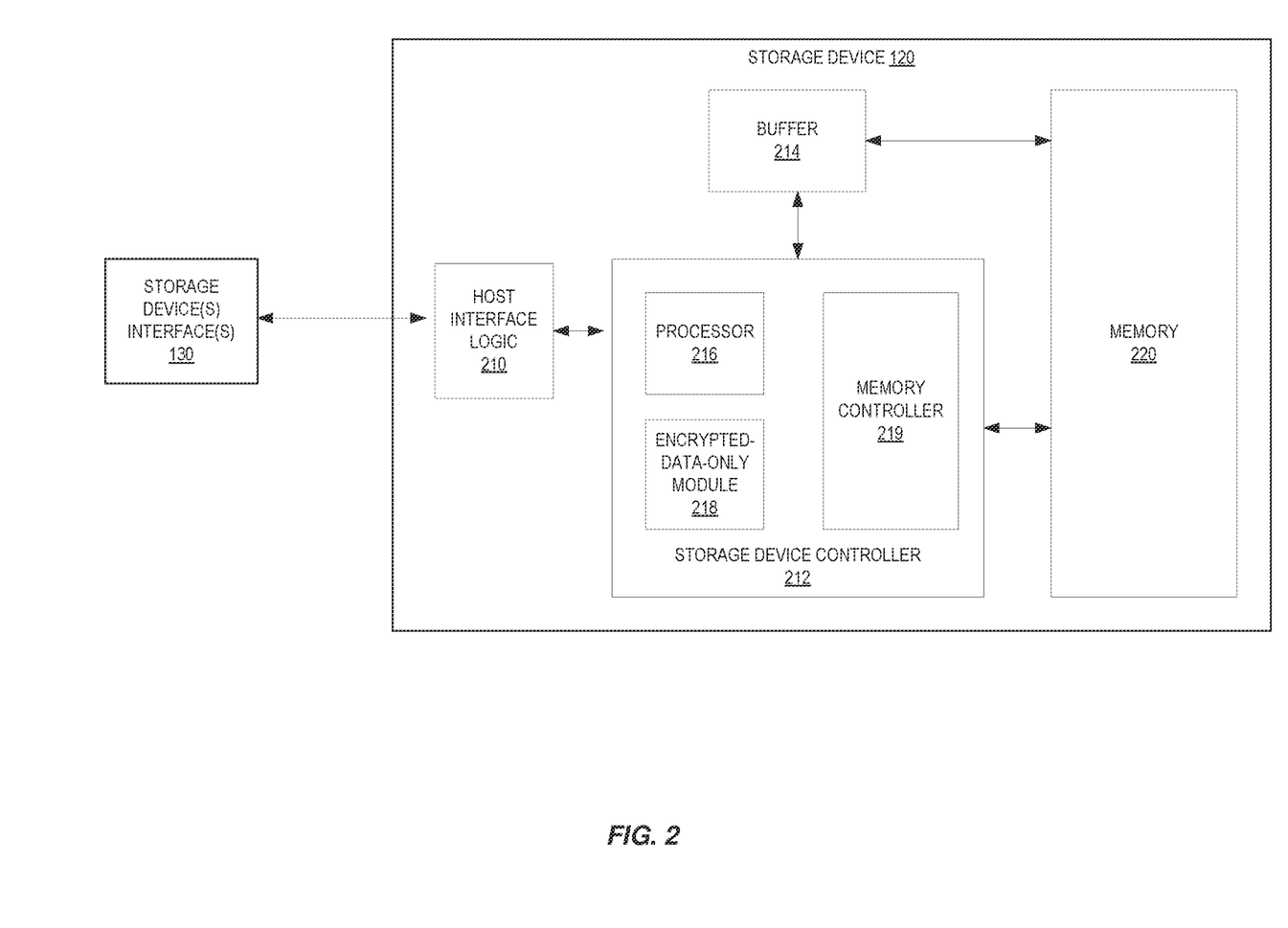
FIG. 2 illustrates embodiments of a storage device that supports encrypted-data-only.

FIG. 2 illustrates embodiments of a storage device that supports encrypted-data-only. For example, in some embodiments, this is storage device 120. As shown, the exemplary storage device includes a host interface logic 210 which is a conduit to a host's storage device interface(s) 130. The host interface logic 210 receives read and write request to store into memory 220 of the storage device 120. Host interface logic 210 may be, for example, a SATA, USB, PCI, etc. interface.

A storage device controller 212 controls at least the read and write operations to memory 220. In this example, the storage device controller 212 logically comprises a processor 216 (such as a microcontroller), a memory controller 219 (which reads and writes data from buffer 214) to memory 220), and an encrypted-data-only module 218.

The encrypted-data-only module 218 determines if incoming data, received via the host interface logic 210, is encrypted. In some embodiments, this determination is made by checking for sufficient entropy of the data to be written that is indicative of usage of encryption (e.g., block, symmetric-based encryption). There are several types of entropy such as Shannon entropy (a quantification of the difficulty of guessing a typical output of random sources), Renyi entropy, min-entropy (corresponding to the difficulty of guessing the most likely output of random sources). At least one standard (NIST SP 800-90B) supports using min-entropy to quantify randomness based output of ten algorithms (with the minimum entropy of those ten algorithms being the estimate of min-entropy). Other entropy tests include, but are not limited to AIS 20/31 which estimates the theoretical entropy based on a provided probabilistic model of the entropy source, etc. The encrypted-data-only module 218 is, in some embodiments, software or firmware stored in the storage device 120 to be executed by the processor 216. In other embodiments, the encrypted-data-only module 218 is dedicated hardware. Note that even with drive re-encryption that data this approach still works due to the entropy check.

Figure 3:
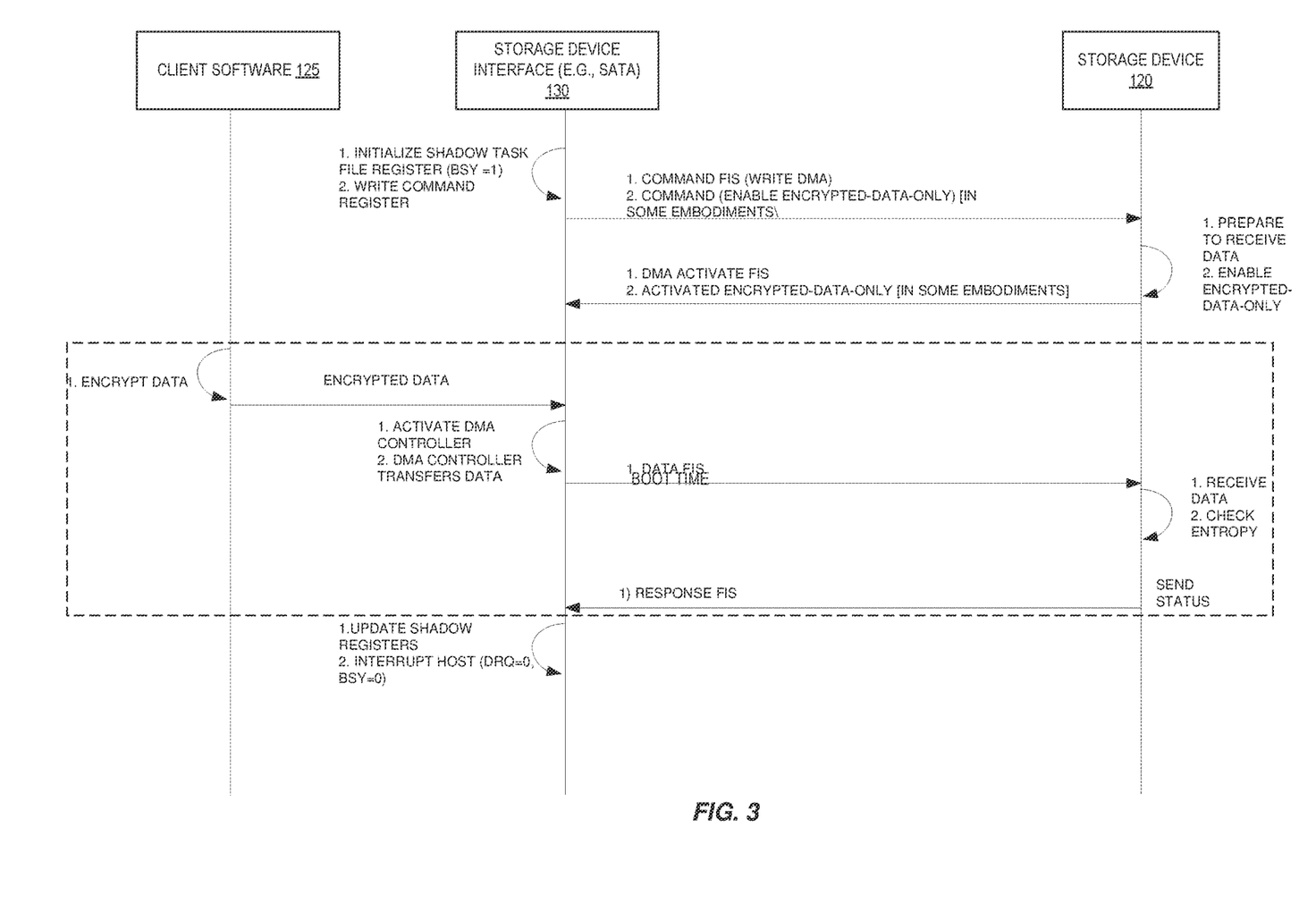
FIG. 3 illustrates a swimlane diagram showing an exemplary process flow according to some embodiments.

FIG. 3 illustrates a swimlane diagram showing an exemplary process flow according to some embodiments. As shown, client software 125 interacts with its storage device interface 130, which in turn interacts with a storage device 120. In this illustrates, the storage device 120 is a SATA device.

The storage device interface 130 first performs an initialization procedure (initialize shadow task file register and write to a command register) to use the storage device 120. In some embodiments, a write to the command register includes an indication that encrypted-data-only is to be enabled.

The storage device interface 130 transmits a command to the storage device 120 to tell it to prepare to receive data. In some embodiments, another command is sent to the storage device 120 to tell it to enable encrypted-data-only operation. Note that encrypted-data-only operation may have already been enabled (e.g., via an asynchronous operation—such as the toggling of a physical switch, etc. or be enabled by default). When enabled by default, in some embodiments, the secondary command would be used to turn off encrypted-data-only operation.

The storage device 120 then performs a procedure to prepare itself to receive data, and, in some embodiments, also enables encrypted-data-only operation.

The storage device 120 then alerts the storage device interface 130 that it is ready to receive data. In some embodiments, an indication of encrypted-data-only operation being enabled is also sent.

With the storage device 120 ready to receive encrypted-data-only, the client software 125 encrypts data to be stored. As noted, this encryption may be done using a software-based encryption algorithm, a cryptography hardware device, and/or using instructions for encrypting data. This encrypted data is sent to the storage device interface 130.

The storage device interface 130 activates a DMA controller and uses it to transfer the encrypted data using a data frame information structure (FIS). The storage device 120 receives the data and checks for sufficient entropy. Depending upon the result of that check, a different status message is sent. When there is sufficient entropy, the status indicates a successful write. When there is insufficient entropy, the status indicates an unsuccessful write. Note that the sending of encrypted data, etc. may repeat without having to re-initialized, etc.

The storage device interface 130 updates the shadow registers and interrupts the host to let the host know of the status when writes have completed.

Figure 4:
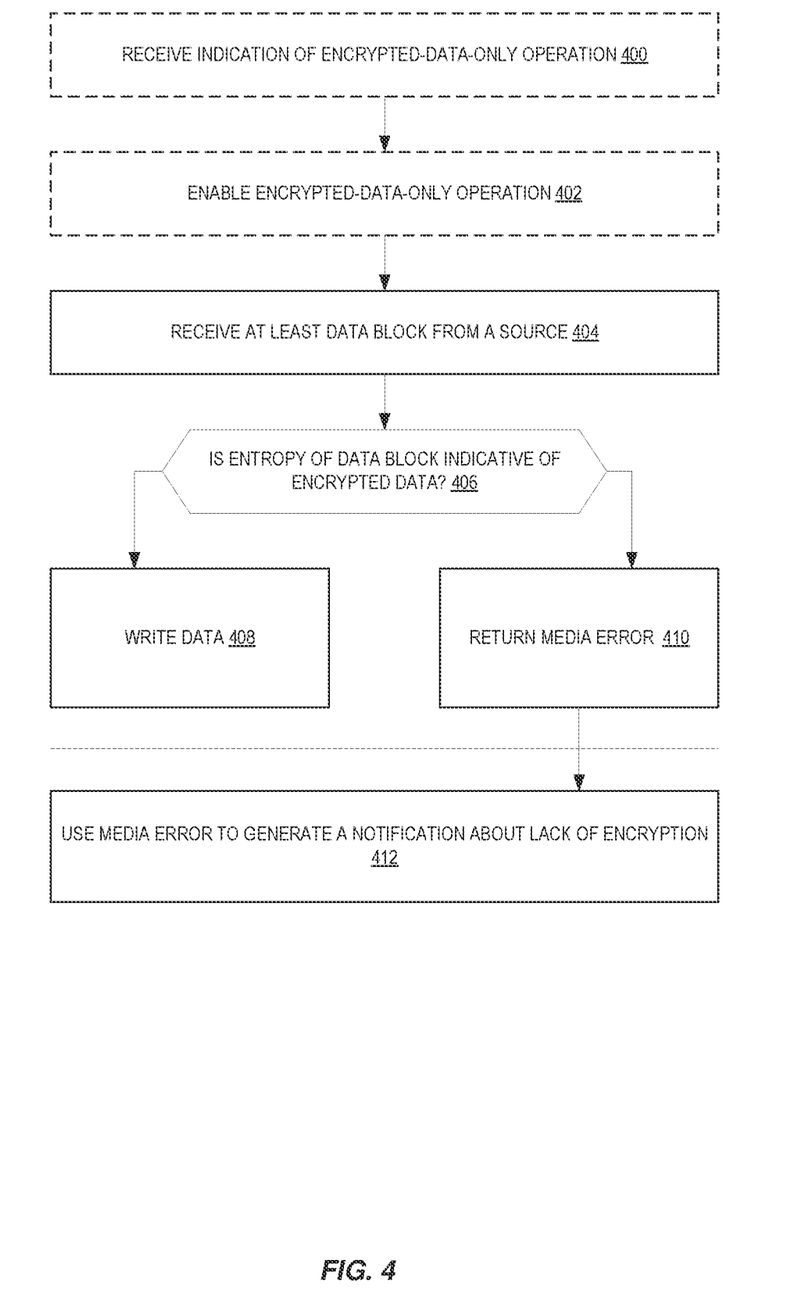
FIG. 4 is a flow diagram illustrating operations of a method for utilizing encrypted-data-only storage according to some embodiments.

FIG. 4 is a flow diagram illustrating operations of a method for utilizing encrypted-data-only storage according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by one or more of the storage devices (such as using the encrypted-data-only module 218) and/or monitors of the other figures.

An indication that encrypted-data-only operation is to be used is received at 400 in some embodiments. For example, a physical indication (e.g., switch toggle, button press, etc.) is received, or a software-based command is received.

Encrypted-data-only operation is enabled at 402 in some embodiments. For example, in response to the indication that encrypted-data-only operation is to be used the encrypted-data-only operation is enabled. This may include activating an encrypted-data-only operation module.

At 404 a data block is received from a source. Note that the transfer from the source may include multiple blocks (for example, an 8 Kb transfer of data may include a plurality of blocks of data (e.g., 32-bit blocks, 64-bit blocks, 128-bit blocks, 256-bit blocks, etc.). In some embodiments, this data block is buffered.

In some embodiments, a determination of if the entropy of if the data block is indicative of encrypted data is made at 406. For example, in some embodiments, the encrypted-data-only operation module 218 performs this determination as detailed above. Note that a data block may comprises a plurality of sub-blocks. The entropy determination may be performed on 1) only one of those sub-blocks, 2) multiple of the sub-blocks in series, 3) multiple of the sub-blocks in parallel, or 4) on all of the sub-blocks as a whole block. In some embodiments, the encrypted-data-only monitor 135 performs this determination. Either of the locations can be considered aspects of a storage location. Note that in some embodiments, the determination is done for only X writes, or every Y write, etc.

When there is sufficient entropy, the received data is written to memory at 408. In some embodiments, this writing is from a buffer.

When there is insufficient entropy, the received data is not written to memory and a media error is returned at 410.

In some embodiments, the media error is used to generate a notification about lack of encryption or corrupted data at 412. This notification may be used to update a health status of the storage device (such that it is inspected, removed from service until inspection, removed from service without inspection, etc.) or alert a software developer or admin that the encryption may not be configured correctly.

Figure 5:
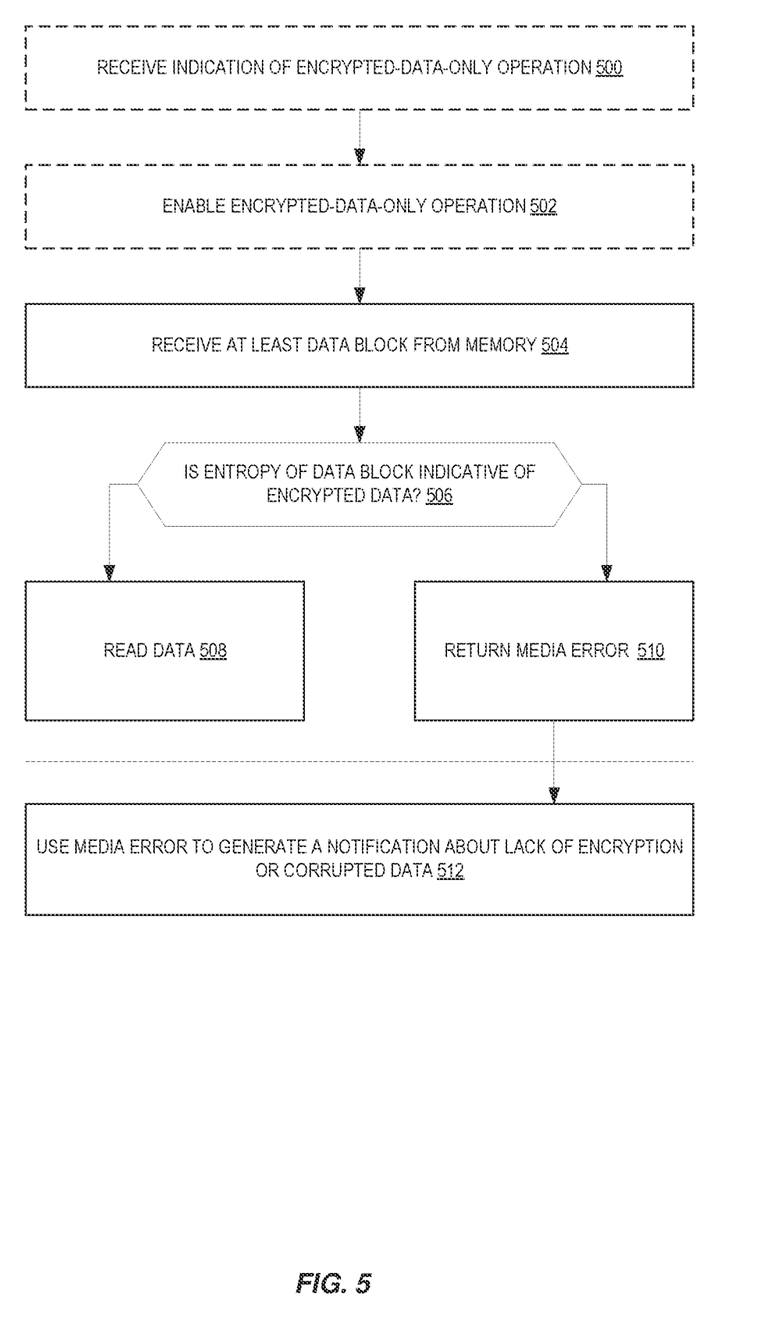
FIG. 5 is a flow diagram illustrating operations of a method for utilizing encrypted-data-only storage according to some embodiments.

FIG. 5 is a flow diagram illustrating operations of a method for utilizing encrypted-data-only storage according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by one or more of the storage devices (such as using the encrypted-data-only module 218) and/or monitors of the other figures.

An indication that encrypted-data-only operation is to be used is received at 500 in some embodiments. For example, a physical indication (e.g., switch toggle, button press, etc.) is received, or a software-based command is received.

Encrypted-data-only operation is enabled at 502 in some embodiments. For example, in response to the indication that encrypted-data-only operation is to be used the encrypted-data-only operation is enabled. This may include activating an encrypted-data-only operation module.

At 504 a data block is received from memory. Note that the transfer from memory may include multiple blocks (for example, an 8 Kb transfer of data may include a plurality of blocks of data (e.g., 32-bit blocks, 64-bit blocks, 128-bit blocks, 256-bit blocks, etc.). In some embodiments, this data block is buffered. Note that in some embodiments, the determination is done for only X reads, or every Y read, etc.

A determination of if the entropy of if the data block is indicative of encrypted data is made at 506. For example, in some embodiments, the encrypted-data-only operation module 218 performs this determination as detailed above. Note that a data block may comprises a plurality of sub-blocks. The entropy determination may be performed on 1) only one of those sub-blocks, 2) multiple of the sub-blocks in series, 3) multiple of the sub-blocks in parallel, or 4) on all of the sub-blocks as a whole block. In some embodiments, the encrypted-data-only monitor 135 performs this determination. Either of the locations can be considered aspects of a storage location.

When there is sufficient entropy, the received data is read from memory at 508. Note that the data is still encrypted and to use the encrypted data it still has to be decrypted.

When there is insufficient entropy, the received data is not read from memory and a media error is returned at 510. The media error indicates a bad read.

In some embodiments, the media error is used to generate a notification about lack of encryption or corrupted data at 512. This notification may be used to update a health status of the storage device (such that it is inspected, removed from service until inspection, removed from service without inspection, etc.) or alert a software developer or admin that the encryption may not be configured correctly.

Figure 6:
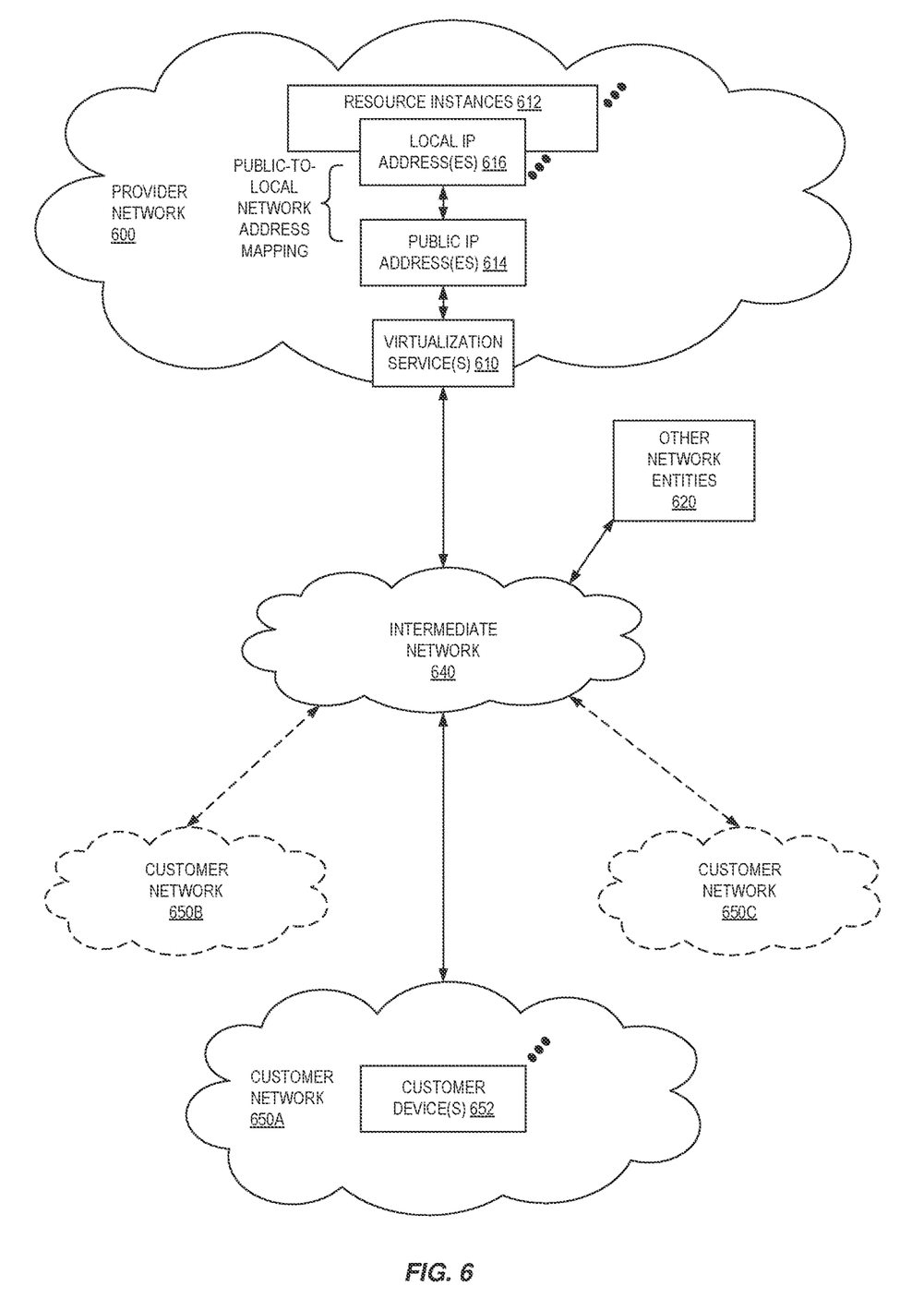
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
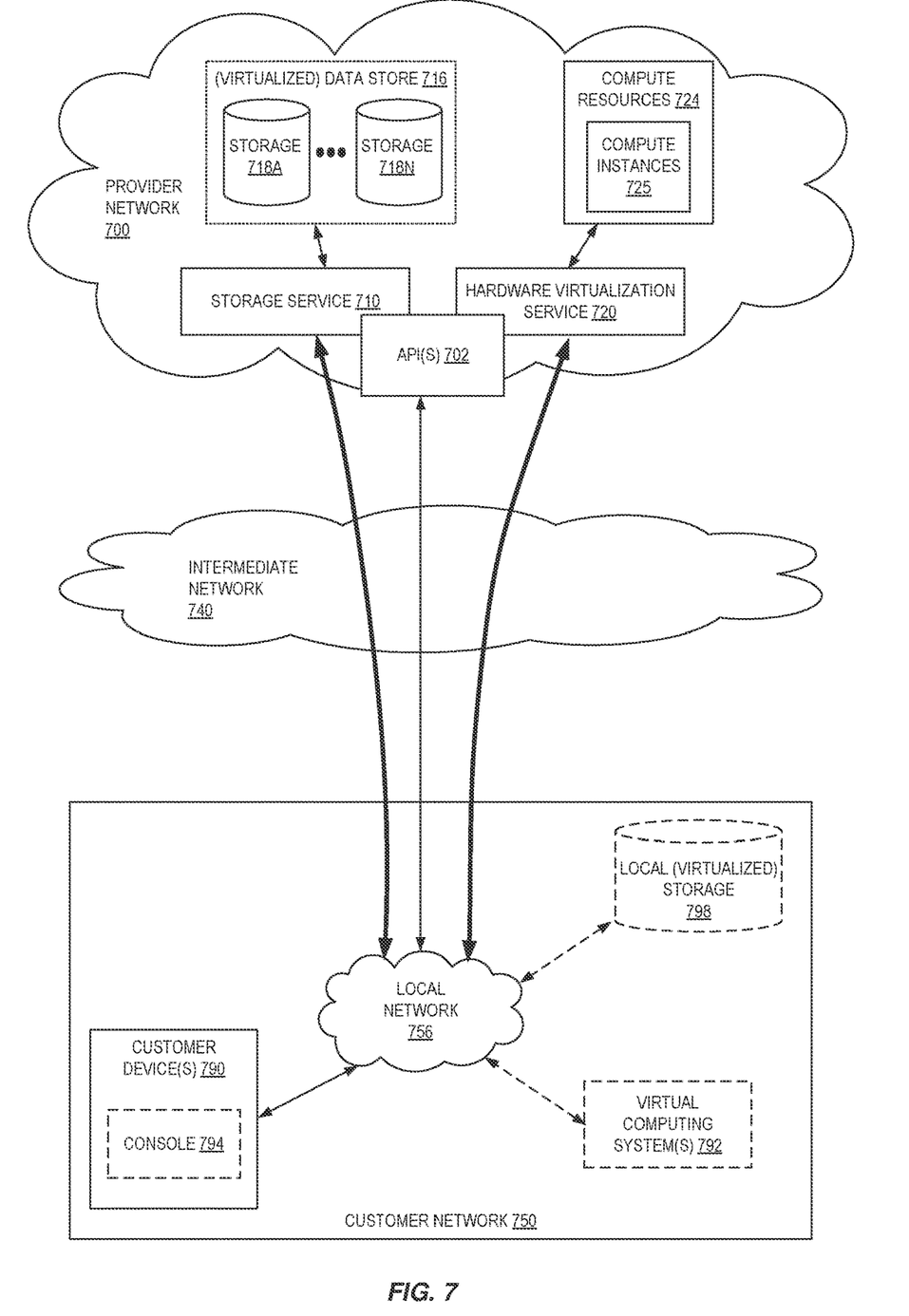
FIG. 7 is a block diagram of an example provider network environment that provides a storage service and a hardware virtualization service to customers, according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
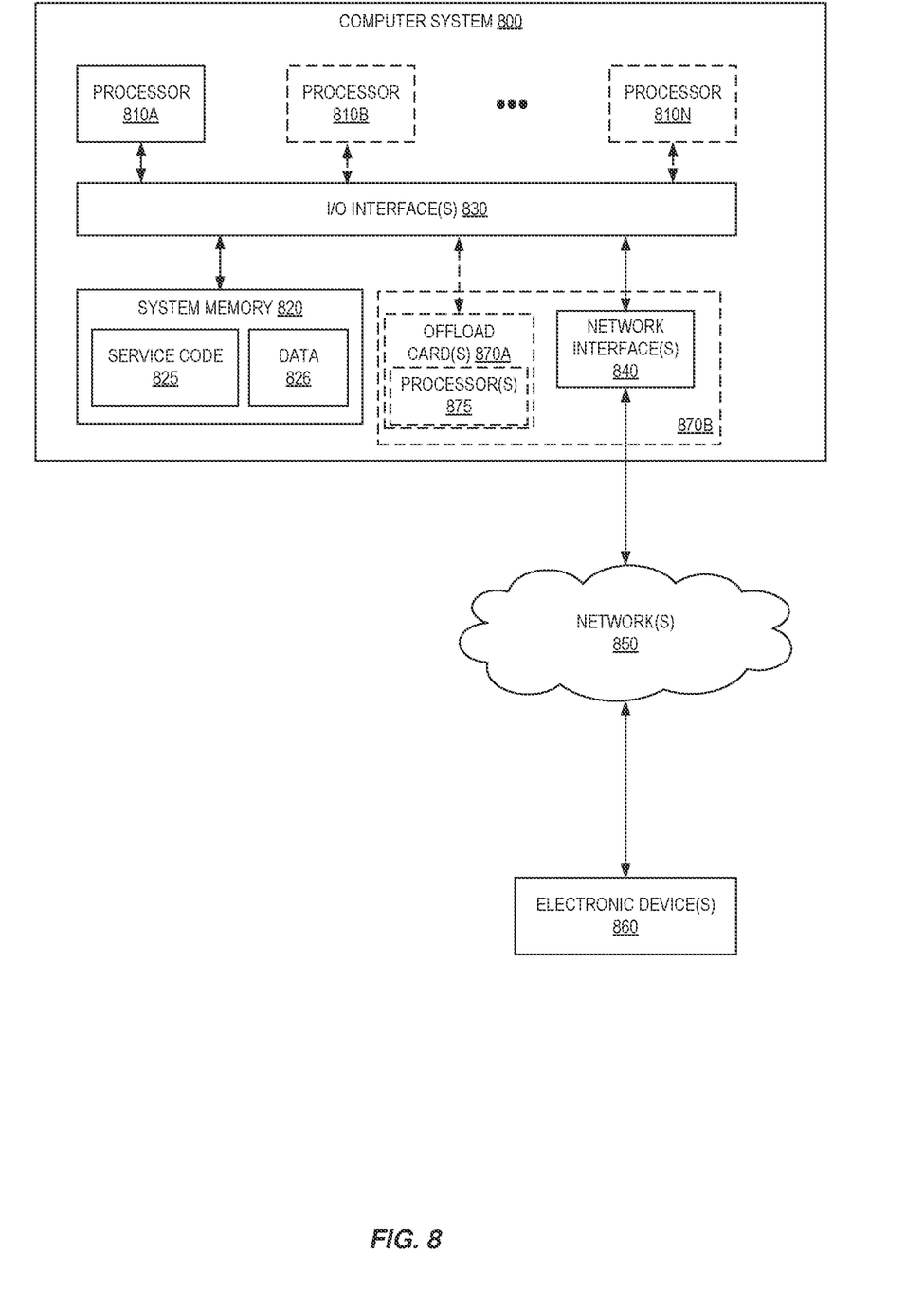
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as service code 825 and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/ telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and cannot coordinate with (or service) any separate hypervisor.

In some embodiments, the system memory 820 can be one embodiment of a computer-accessible medium configured to store program instructions and data as described above. However, in other embodiments, program instructions and/ or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   receiving, at a serial advanced technology attachment (SATA) storage device, a data block from a source, the data block to be written to a memory of the SATA storage device;
   ascertaining that an entropy of the data block is indicative of encrypted data based only on determining a respective entropy amount of only one sub-block of the data block and not based on a respective amount of entropy determined for another sub-block of the data block, wherein the data block comprises a plurality of sub-blocks; and
   in response to ascertaining that the entropy of the data block is indicative of encrypted data, writing the data block to the memory of the SATA storage device.

2. The computer-implemented method of claim 1, further comprising:
   prior to the receiving the data block at the serial advanced technology attachment (SATA) storage device, receiving a SATA command at the SATA storage device, the SATA command to enable encryption detection;
   wherein the determining the respective entropy of each sub-block of only one sub-block of the data block is performed based on receiving the SATA command.

3. The computer-implemented method of claim 1, wherein the data block is encrypted using a block cipher.

4. A computer-implemented method comprising:
- receiving, at a storage device, a data block from a source, the data block to be written to a memory of the storage device;
- determining, at the storage device, a respective entropy amount of only one sub-block of a plurality of sub-blocks of the data block;
- determining, at the storage device, that the data block is encrypted based only on the respective amount of entropy determined for the only one sub-block of the data block and not based on a respective amount of entropy determined for another sub-block of the data block; and
- in response to determining that the data block is encrypted, writing, at the storage device, the data block to the memory of the storage device.

5. The computer-implemented method of claim 4, further comprising:
- prior to the receiving the data block at the storage device, receiving a physical input to the storage device, the physical input to enable encryption detection;
- wherein the determining, at the storage device, the respective amount of entropy of each sub-block of only one sub-block of the data block is performed based on receiving the physical input.

6. The computer-implemented method of claim 4, further comprising:
- prior to the receiving the data block at the storage device, receiving a software command at the storage device, the software command to enable encryption detection;
- wherein the determining, at the storage device, the respective amount of entropy of each sub-block of only one sub-block of the data block is performed based on receiving the software command.

7. The computer-implemented method of claim 6, wherein the software command is a serial advanced technology attachment (SATA)-based command.

8. The computer-implemented method of claim 4, wherein determining whether the data block is encrypted is based on ascertaining entropy of the only one sub-block using an algorithm that is based on Shannon entropy, Renyi entropy, or min-entropy.

9. The computer-implemented method of claim 4, wherein determining whether the data block is encrypted is based on ascertaining entropy of the only one sub-block using a probabilistic model.

10. The computer-implemented method of claim 4, wherein the data block is encrypted using a block cipher.

11. The computer-implemented method of claim 4, further comprising:
- determining that the data block is encrypted based only on the respective amount of entropy determined for one sub-block of the data block and not based on a respective amount of entropy determined for another sub-block of the data block.

12. The computer-implemented method of claim 4, wherein the storage device is a part of a storage system for a cloud computing provider.

13. The computer-implemented method of claim 4, wherein the storage device is one of a hard disk, a solid-state drive, 3D cross-point, optical drive, tape drive, and a heat-assisted magnetic recording device.

14. The computer-implemented method of claim 4, further comprising:
- after writing the data block to the memory of the storage device, receiving a physical input to the storage device, the physical input to disable encryption detection.

15. The computer-implemented method of claim 4, further comprising:
- determining entropy of the plurality of sub-blocks in parallel.

16. A system comprising:
- a first one or more electronic devices to implement a client server in a multi-tenant provider network;
- a second one or more electronic devices to implement encrypted data enforcement for a storage device in the multi-tenant provider network, the encrypted data enforcement to:
- receive a data block from a source in the multi-tenant provider network, the data block to be written to a memory of the storage device;
- determine a respective entropy amount for only one sub-block of a plurality of data blocks of the data block;
- determine that the data block is encrypted based only on the respective entropy amount determined for the only one sub-block of the plurality of sub-blocks of the data block and not based on a respective amount of entropy determined for another sub-block of the data block; and
- write the data block to the memory of the storage device in response to determining that the data black is encrypted.

17. The system of claim 16, wherein the storage device is a serial advanced technology attachment (SATA) device.

18. The system of claim 16, wherein the data block is encrypted using a block cipher.

19. The system of claim 16, wherein the storage device is configured to:
- determine that the data block is encrypted based only on the respective entropy determined for one sub-block of the data block and not based on a respective entropy determined for another sub-block of the data block.

20. The system of claim 16, wherein to determine whether the data block is encrypted is performed by ascertaining entropy of the only one sub-block using an algorithm that is based on Shannon entropy, Renyi entropy, or min-entropy.

21. A computer-implemented method comprising:
- receiving a data block from memory of a storage device;
- determining whether the data block is encrypted at a storage location based only on a respective amount of entropy of only one sub-block of a plurality of sub-blocks of the data block and not based on a respective amount of entropy determined for another sub-block of the data block; and
- in response to determining that the data block is encrypted, passing the data block to a client of the storage device.

22. The computer-implemented method of claim 21, wherein determining whether the data block is encrypted is based on ascertaining entropy of the only one sub-block using an algorithm that is based on Shannon entropy, Renyi entropy, or min-entropy.

23. The computer-implemented method of claim 21, wherein determining whether the data block is encrypted is based on ascertaining entropy of the only one sub-block using a probabilistic model.

24. The computer-implemented method of claim 21, wherein the data block is encrypted using a block cipher.

25. The computer-implemented method of claim 21, further comprising:
- determining that the data block is encrypted based only on the respective amount of entropy determined for one sub-block of the data block and not based on a respective amount of entropy determined for another sub-block of the data block.

26. The computer-implemented method of claim 21, wherein the storage device is a part of a storage system for a cloud computing provider.

27. The computer-implemented method of claim 21, wherein the storage device is one of a hard disk, a solid-state drive, 3D cross-point, optical drive, tape drive, and a heat-assisted magnetic recording device.

28. The computer-implemented method of claim 21, further comprising:
   determining entropy of the plurality of sub-blocks in parallel.

* * * * *